(12) United States Patent  
Muldoon

(10) Patent No.: US 9,317,266 B1  
(45) Date of Patent: Apr. 19, 2016

(54) LEVERAGING LEGACY APPLICATIONS FOR USE WITH MODERN APPLICATIONS

(71) Applicant: Bank of America Corporation, Charlotte, NC (US)

(72) Inventor: William Muldoon, Newtown, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/539,349

(22) Filed: Nov. 12, 2014

(51) Int. Cl.  
*G06F 9/45* (2006.01)

(52) U.S. Cl.  
CPC . *G06F 8/51* (2013.01); *G06F 8/447* (2013.01)

(58) Field of Classification Search  
None  
See application file for complete search history.

(56) References Cited

U.S. PATENT DOCUMENTS

| | | | |
|---|---|---|---|
| 6,230,117 B1* | 5/2001 | Lymer | G06F 8/30 703/22 |
| 6,453,464 B1* | 9/2002 | Sullivan | G06F 8/51 717/136 |
| 6,519,766 B1* | 2/2003 | Barritz | G06F 11/3466 714/E11.2 |
| 6,775,680 B2* | 8/2004 | Ehrman | G06F 9/5027 |
| 2002/0073118 A1* | 6/2002 | Costigan, Jr. | G06F 8/30 715/209 |
| 2005/0015758 A1* | 1/2005 | North | G06F 9/45516 717/138 |
| 2005/0039173 A1* | 2/2005 | Tondreau, Jr. | G06F 8/45 717/136 |
| 2008/0306986 A1 | 12/2008 | Doyle, Sr. | |
| 2009/0077543 A1* | 3/2009 | Siskind | G06F 8/447 717/136 |
| 2009/0222467 A1* | 9/2009 | Kalia | G06F 17/30595 |
| 2011/0246973 A1* | 10/2011 | Meijer | G06F 8/427 717/140 |
| 2011/0289490 A1* | 11/2011 | McAtamney | G06F 8/51 717/137 |
| 2012/0159444 A1* | 6/2012 | Agarwal | G06F 11/3624 717/124 |
| 2013/0227533 A1* | 8/2013 | Tonkin | G06F 8/51 717/137 |

OTHER PUBLICATIONS

Ttle: JZOS toolkit for Z/OS Java, version 7.00 dated: Nov. 2012.*

* cited by examiner

*Primary Examiner* — Chameli Das  
(74) *Attorney, Agent, or Firm* — Michael A. Springs

(57) ABSTRACT

An apparatus of one embodiment translates computer code from a first programming language to a second programming language. The apparatus includes an interface, a memory, and a processor. The interface is operable to receive a compiler output that is associated with source code written in a first programming language. The memory is operable to store the compiler output. The processor is communicatively coupled to the interface and the memory and is operable to analyze the data structures within the compiler output, build an internal representation of the source code based on the compiler output, and create a source code template associated with a second programming language.

20 Claims, 7 Drawing Sheets

```
/**
 * Java version of COBOL program
 */
public class CUSTC110 { protected static Logger log = Logger.getLogger( CUSTC110.class );

// Files
    private ZFile dumpFle = null;      // DUMP-FLE using IND-DUMP-RC
    private ZFile auditFile = null;    // AUDIT-FILE using AUDIT-RECORD // Level 01 Data structures
    // DumpRc for "DUMP-RC" and "DUMP-FLE"
    private DumpRc dumpRc = new DumpRc();

// AuditRecord for ["AUDIT-RECORD" and "AUDIT-FILE"
    private AuditRecord auditRecord = new AuditRecord();
```

```
/**
 * open AuditFile file
 *
 * @throws ZFileException
 */
private void openAuditFile() throws ZFileException {
    log.info( "openAuditFile() //DD:AUDIT" );

auditFile = new ZFile( "//DD:AUDIT", "rb");
}
```

```
/**
 * read AuditFile file
 *
 * @throws ZFileException
 */
private AuditRecord readAuditFile() throws ZFileException { if ( auditFile == null ){
        return null;
    } byte buf[] = new byte[ AuditRecord.AUDIT_RECORD_len ];

if ( auditFile.read( buf, 0, AuditRecord.AUDIT_RECORD_len ) == -1 ){
        log.info( "***EOF in auditFile file" );
        return null;
    } return new AuditRecord( buf );
}
```

*FIG. 4B*

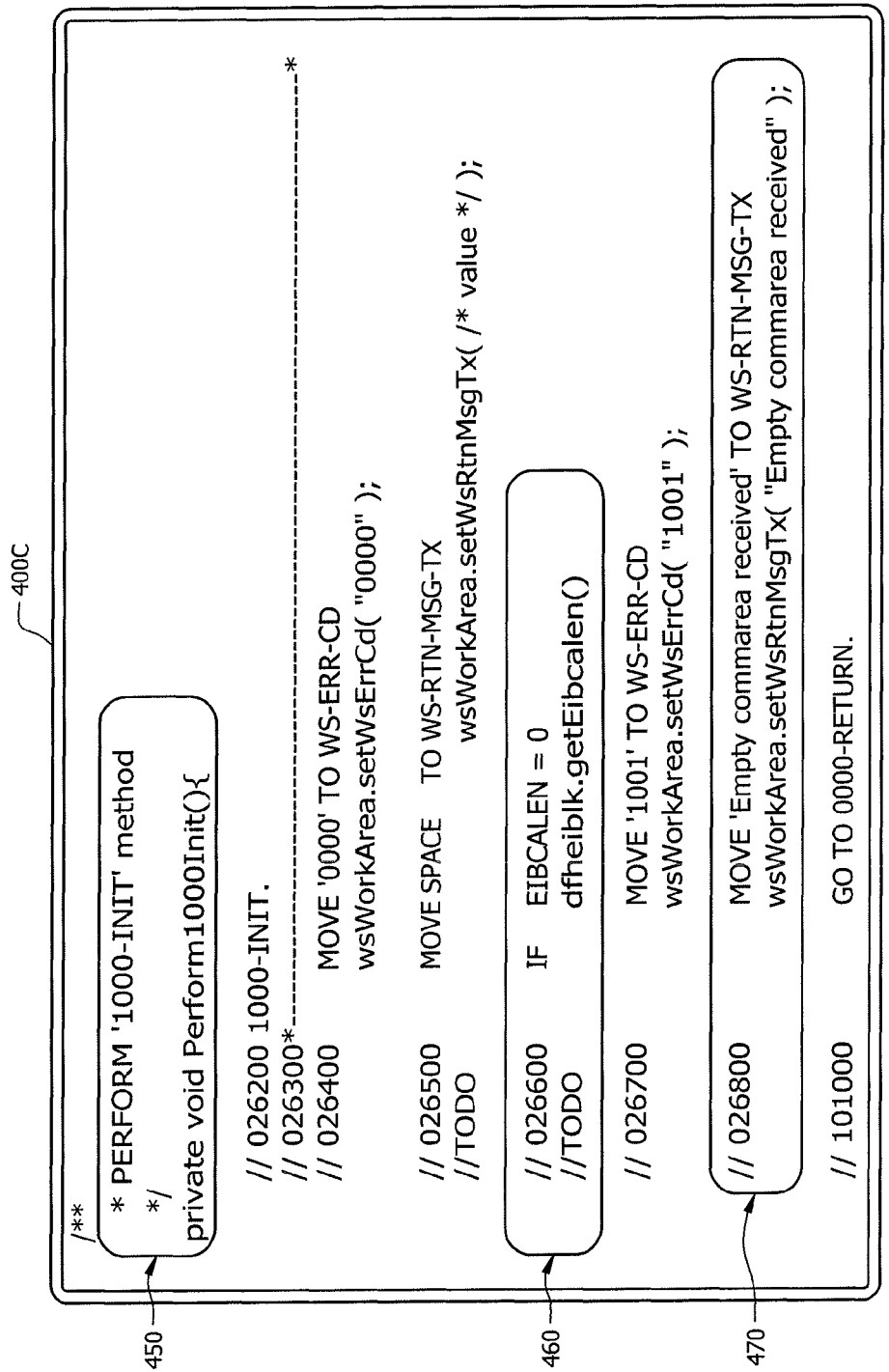

```
/**
 * PERFORM '1000-INIT' method
 */
private void Perform1000Init(){
    Log.info( "Perform1000Init()" );

// 022200 1000-INIT.
// 022300
// 022400*    Open files
// 022500     Open input IND-DUMP-FLE
// 022600     If not(WS-IND-DUMP-FLE-STA = '00')
// 022700         Move 9999                       to WS-ERR-CD
// 022800         Move spaces                     to WS-RTN-MSG-TX
// 022900         String 'Error opening IND dump file - '
// 023000                WS-IND-DUMP-FLE-STA delimited by size
// 023100                into WS-RTN-MSG-TX
// 023200         end-string
// 023300         Go to 1000-EXIT
// 023400     end-if try {
        openIndDumpFle();
    } catch (ZFileException e) {
        wsRtnInf.setWsErrCd( 9999 );
        wsRtnInf.setWsRtnMsgTx( "Error opening IND dump file - " +
                                e.getErrnoMsg() + " " + e.getMessage() );
        Log.error( "Error opening IND DUMP file", e );
        return;
    }
}
```

FIG. 4D

LEVERAGING LEGACY APPLICATIONS FOR USE WITH MODERN APPLICATIONS

TECHNICAL FIELD

This disclosure relates generally to application development and, more specifically, to techniques for leveraging legacy applications for use with modern applications.

BACKGROUND

For decades, enterprises have invested significant resources developing applications to run their critical enterprise systems. As technology has advanced, the programming languages running these critical enterprise systems have remained the same. Maintaining applications written in a legacy programming language presents challenges for maintenance, application updates, and application development.

SUMMARY OF THE DISCLOSURE

In accordance with the present disclosure, disadvantages and problems associated with translating computer code may be reduced or eliminated.

According to one embodiment of the present disclosure, an apparatus for translating computer code includes an interface, a memory, and a processor. The interface is operable to receive a compiler output that is associated with source code written in a first programming language. The memory is operable to store the compiler output. The processor is communicatively coupled to the interface and memory and is operable to analyze a plurality of data structures in the compiler output, build an internal representation of the source code based on the compiler output, and create a source code template associated with a second programming language.

According to one embodiment of the present disclosure, a method comprises receiving a compiler output. The compiler output is based on the source code, which is written in a first programming language. A plurality of data structures within the compiler output are analyzed and an internal representation of the source code based on the compiler output is built. A source code template associated with a second programming language is then created.

Certain embodiments of the invention may provide one or more technical advantages. A technical advantage of one embodiment may allow for improved productivity by utilizing modern tools that are associated with newer programming languages. Certain embodiments may leverage the skill sets of a wider talent pool as more programmers are able to work with a second, more familiar, programming language. Some embodiments may allow for the easier maintenance, upkeep, and development of the critical enterprise systems by translating source code written in an antiquated programming language into a modern language. Certain embodiments of the present disclosure may facilitate a reduced development time of program translation, leading to saved resources. One or more other technical advantages may be readily apparent to one skilled in the art from the figures, descriptions, and claims, included herein.

BRIEF DESCRIPTION OF THE DRAWINGS

For a more complete understanding of the present disclosure and for further features and advantages thereof, reference is now made to the following description taken in conjunction with the accompanying drawings, in which:

FIG. 4A illustrates an example translated source code template including member variables;

FIG. 4B illustrates an example translated source code template including file access commands;

FIG. 4C illustrates an example translated source code template including method commands; and FIG. 4D illustrates an example translated source code template after a manual update.

DETAILED DESCRIPTION

Embodiments of the present disclosure and its advantages are best understood by referring to FIGS. 1-4D, like numerals being used for like and corresponding parts of the various drawings.

For decades, enterprises have invested significant resources developing applications to run their critical enterprise systems. As technology has advanced, the programming languages running these critical enterprise systems have remained the same. Maintaining applications written in a legacy programming language presents challenges for maintenance, application updates, and application development.

It is advantageous to provide a system and method that facilitate the translation of a program written in a first programming language into a program written in a second programming language. For example, a translation module receives the output of a compiler that has compiled the source code of a program written in a first programming language. The translation module may then analyze the compiler output to identify the data structures used in the first program. The translation module may then map the data structures of the first programming language to classes and objects associated with a second programming language. The translation module may also identify the control flow and interaction of the data structures as they are used in the original source code. The translation module may then create a translated source code template using the classes and objects of the second programming language while maintaining the structure and program flow found in the original program.

In certain embodiments, the translation module may identify high-level data structures within the compiler output and send the data associated with the high-level data structures to a record generator. The record generator may then create a class in the second programming language based on the high-level data structures of the first programming language. The record generator may also determine the fields comprising the high-level data structures associated with the first program and generate corresponding headers associated with the second programming language.

Figure 1:
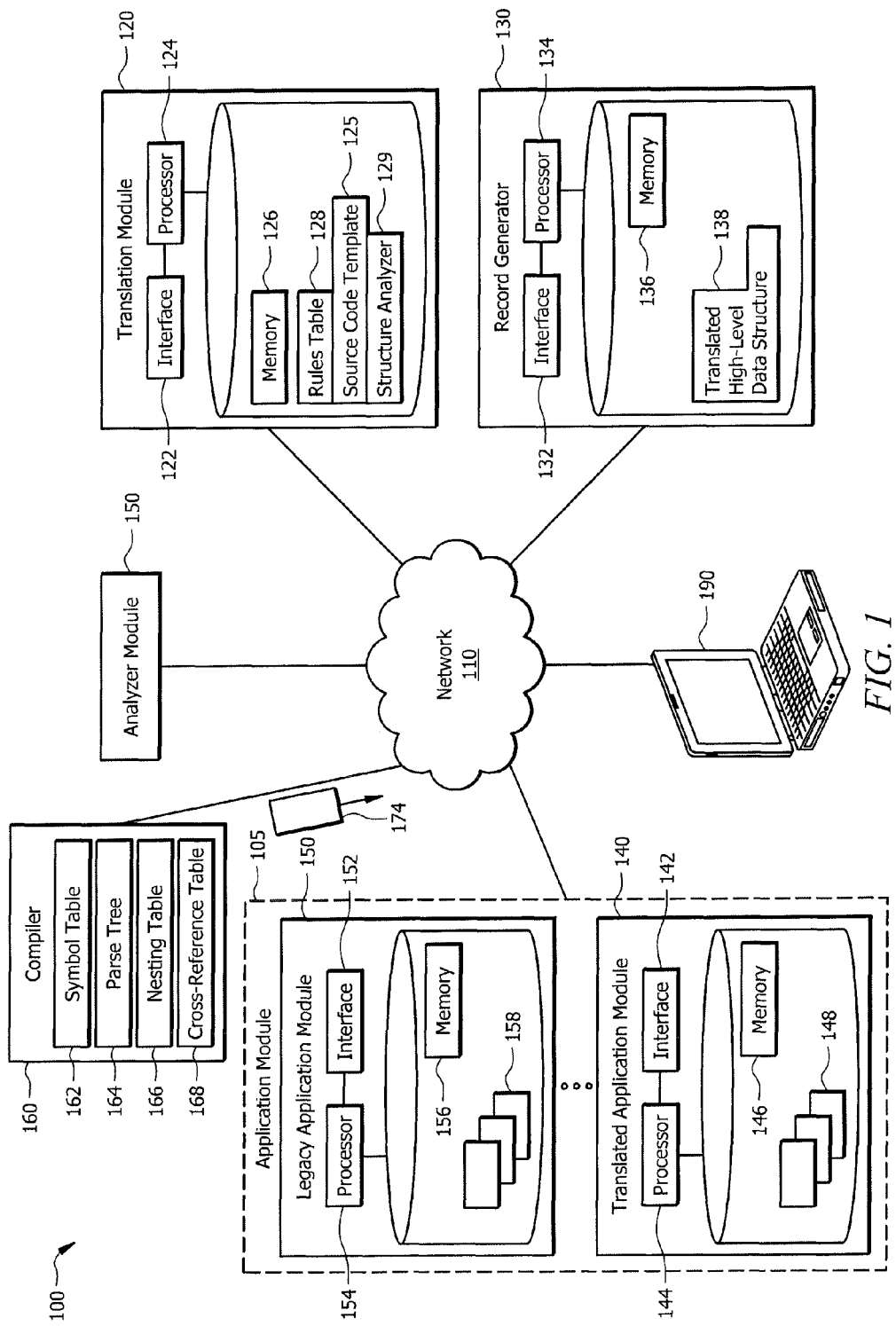
FIG. 1 illustrates an example system for translating computer applications into a different programming language.

FIG. 1 illustrates an example system for translating computer applications into a different programming language. System 100 includes translation module 120 that communicates with application module 105, record generator 130, compiler 160, and workstation 190 through network 110.

Network 110 represents any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof operable to facilitate communication between the components.

Application module 105 represents any suitable components that maintain information and perform processing relating to applications used in an enterprise. Application module 105 may include one or more applications running critical enterprise logic. Applications contained within application module 105 may be written in a number of programming languages such as COBOL, Fortran, C, and JAVA. Application module 105 may include a network server, remote server, mainframe, host computer, workstation, web server, personal computer, file server, or any other suitable device operable to communicate with other devices and process data. In some embodiments, application module 105 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems. Application module 105 may contain one or more application modules. The functions of application module 105 may be performed by any suitable combination of one or more servers or other components at one or more locations. In the embodiment where the modules are servers, the servers may be public or private servers, and each server may be a virtual or physical server. The server may include one or more servers at the same or at remote locations. In an embodiment, application module 105 may also include any suitable component that functions as a server.

In the illustrated embodiment, application module 105 includes translated application module 140 and legacy application module 150. Translated application module 140 contains interface 142, processor 144, and memory 146. Memory 146 contains translated source code template 148. Legacy application module 150 contains interface 152, processor 154, and memory 156. Memory 156 contains source code 158.

Interface 142 of translated application module 140 may facilitate the communication of source code template 125 from translation module 120 or receive translated high-level data structure 138 from record generator 130. Interface 142 may also facilitate interaction with workstation 190, allowing users to update or edit translated source code template 148.

Interface 152 of legacy application module 150 and interface 142 of translated application module 140 represent any suitable device operable to receive information from network 110, transmit information through network 110, perform suitable processing of the information, communicate to other devices, or any combination thereof. For example, interface 152 of legacy application module 150 may facilitate the communication of source code 158 to compiler 160. Interface 152 may also transmit source code 158 to analyzer module 150.

Interface 142 of translated application module 140 and interface 152 of legacy application module 150 represent any port or connection, real or virtual, including any suitable hardware and/or software, including protocol conversion and data processing capabilities, to communicate through a LAN, WAN, or other communication system that allows application module 105 to exchange information with network 110, translation module 120, record generator 130, analyzer module 150, compiler 160, workstation 190, or other components of system 100.

Processor 144 of translated application module 140 communicatively couples interface 142, memory 146, and controls the operation of translated application module 140. Processor 144 includes any hardware and software that operates to control and process information. For example, processor 144 may receive source code template 125 from translation module 120. Source code template 125 may then be stored in memory 146 as translated source code template 148. In another example, processor 144 receives translated high-level data structure 138 from record generator 130, which can then be stored in memory 146 and added to translated source code template 148. Processor 144 may be a programmable logic device, a microcontroller, a microprocessor, any suitable processing device, or any suitable combination of the preceding.

Processor 154 of legacy application module 150 communicatively couples interface 152, memory 156, and controls the operation of legacy application module 150. Processor 154 includes any hardware and software that operates to control and process information. For example, processor 154 facilitates the communication of source code 158 to compiler 160 and/or analyzer module 150. Processor 154 may be a programmable logic device, a microcontroller, a microprocessor, any suitable processing device, or any suitable combination of the preceding.

Memory 146 and memory 156 store, either permanently or temporarily, data, operational software, other information for processor 144 and processor 154, respectively, other components of the translated application module 140 and legacy application module 150, respectively, or other components of system 100. Memory 146 and memory 156 include any one or a combination of volatile or nonvolatile local or remote devices suitable for storing information. For example, memory 146 and memory 156 may include RAM, ROM, flash memory, magnetic storage devices, optical storage devices, network storage devices, cloud storage devices, solid-state devices, or any other suitable information storage device or a combination of these devices. Memory 146 and memory 156 may store information in one or more databases, file systems, tree structures, any other suitable storage system, or any combination thereof. Furthermore, different information stored in memory 146 and memory 156 may use any of these storage systems. Moreover, any information stored in memory 146 or memory 156 may be encrypted or unencrypted, compressed or uncompressed, and static or editable. While illustrated as including particular modules, memory 146 and memory 156 may include any suitable information for use in the operation of translated application module 140 and legacy application module 150, respectively.

Translation module 120 represents any suitable components that facilitate the translation of a program from a first programming language to a second programming language. Translation module 120 may also be any suitable components that create and insert comments into source code template 125, based on data structures or programs contained in source code 158. Translation module 120 may include a network server, remote server, mainframe, host computer, workstation, web server, personal computer, file server, or any other suitable device operable to communicate with other devices and process data. In some embodiments, translation module 120 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of translation module 120 may be performed by any suitable combination of one or more servers or other components at one or more locations. In the embodiment where the modules are servers, the servers may be public or private servers, and each server may be a virtual or physical server. The server may include one or more servers at the same or at remote locations. Translation module 120 may also include any suitable component that functions as a server. In some embodiments, record generator 130, translated source code template 148, source code 158, compiler 160, and workstation 190 may be integrated with translation module 120, or they may operate as part of the same device or devices.

In the illustrated embodiment, translation module 120 includes interface 122, processor 124, and memory 126, which comprises source code template 125, rules table 128, and structure analyzer 129.

Interface 122, represents any suitable device operable to receive information from network 110, transmit information through network 110, perform suitable processing of the information, communicate to other devices, or any combination thereof. For example, interface 122 may facilitate the translation of source code 158 by receiving a compiler output 174 from compiler 160 that contains one or more data structures used by source code 158. As another example, interface 122 may communicate source code template 125 to translated application module 140 to be stored in translated source code template 148. Translated source code template 148 may now enable users to leverage the capabilities of the second programming language that were unavailable in source code 158. Interface 122 may also communicate high-level data structures identified by structure analyzer 129 to record generator 130. Communicating high-level data structures to record generator 130 may facilitate a more efficient translation of source code 158 by having record generator 130 provide methods for fields defined in the high-level data structures of source code 158. Interface 122 represents any port or connection, real or virtual, including any suitable hardware and/or software, including protocol conversion and data processing capabilities, to communicate through a LAN, WAN, or other communication system that allows translation module 120 to exchange information with network 110, application module 105, record generator 130, compiler 160, workstation 190, or any other components of system 100.

Processor 124 communicatively couples interface 122 and memory 126 while controlling the operation of translation module 120. Processor 124 includes any hardware and software that operates to control and process information. For example, processor 124 may analyze the data structures contained in compiler output 174. Based on the data structures contained in compiler output 174, processor 124 may then use rules table 128 to build an internal representation of source code 158. In some embodiments, processor 124 generates a list of the data structures contained within compiler output 174 and uses rules table 128 to map the list of data structures to a corresponding set of classes and objects associated with a second programming language. Once an internal representation of source code 158 is built, processor 124 creates a source code template 125 associated with the second programming language. Interface 122 may then communicate source code template 125 to translated application module 140 to create translated source code template 148. In this manner, system 100 may translate source code 158 written in a first programming language into translated source code template 148, written in a second programming language. Processor 124 may be a programmable logic device, a microcontroller, a microprocessor, any suitable processing device, or any suitable combination of the preceding.

Memory 126 stores, either permanently or temporarily, data, operational software, other information for processor 124, other components of translation module 120, or other components of system 100. Memory 126 includes any one or a combination of volatile or nonvolatile local or remote devices suitable for storing information. For example, memory 126 may include RAM, read only memory ROM, flash memory, magnetic storage devices, optical storage devices, network storage devices, cloud storage devices, solid state devices, or any other suitable information storage device or a combination of these devices. Memory 126 may store information in one or more databases, file systems, tree structures, any other suitable storage system, or any combination thereof. Furthermore, different information stored in memory 126 may use any of these storage systems (e.g., rules table 128, structure analyzer 129, or source code template 125 may be stored in a relational database). Moreover, any information stored in memory 126 may be encrypted or unencrypted, compressed or uncompressed, and static or editable. While illustrated as including particular modules, memory 126 may include any suitable information for use in the operation of translation module 120.

In the illustrated embodiment, memory 126 includes rules table 128, source code template 125, and structure analyzer 129.

Rules table 128 may identify keywords corresponding to a first programming language contained in compiler output 174. Rules table 128 may then map the first programming language's keywords to a corresponding set of keywords associated with a second programming language. The translated keyword or keywords provide the same functionality as the keywords of the first programming language. Rules table 128 may also identify how the records and fields in source code 158 are structured in order to maintain the program flow in source code template 125. Translation module 120 may then create source code template 125 based on the mapping completed by rules table 128. Translation module 120 may transmit source code template 125 to translated application module 140 to store in translated source code template 148.

In certain embodiments, rules table 128 is setup to map COBOL to JAVA. For example, source code 158 may be written in COBOL and use the verb PERFORM to execute a set of statements. Compiler 160 compiles the COBOL source code and generates compiler output 174. Compiler output 174 contains data regarding the use of the PERFORM verb in symbol table 162, parse tree 164, nesting table 166, and cross-reference table 168. Translation module 120 receives compiler output 174. Rules table 128 identifies PERFORM as a keyword and maps the PERFORM verb to a corresponding JAVA method that performs the equivalent work of the PERFORM statement. Rules table 128 may also identify the statements that the PERFORM verb executes and create a corresponding routine. Processor 124 may then create source code template 125 that corresponds to the JAVA methods mapped to the COBOL PERFORM verb. An example embodiment of a translated method generated from a COBOL paragraph is discussed in FIG. 4C.

In another example, source code 158 contains a CICS DFHCOMMAREA command. Compiler 160 compiles source code 158 and transmits compiler output 174 to translation module 120. Rules table 128 analyzes compiler output 174, identifies the CICS DFHCOMMAREA command, and generates a corresponding CICS main entry point in source code template 125. In another example, source code 158 may contain a COBOL file definition. Compiler 160 compiles source code 158 and transmits compiler output 174 to translation module 120. Rules table 128 analyzes compiler output 174, identifies the COBOL file definition, and generates a corresponding JZOS ZFile in source code template 125.

In certain embodiments, the classes and objects mapped to the second programming language are assigned names that correspond to the records and fields in the first programming language. Rules table 128 assigns a name to the class or object in the second programming language that complies with the syntax requirements of the second programming language. For example, source code 158 may contain the COBOL statement "PERFORM 1000-INIT THRU." Compiler 160 compiles source code 158 and transmits compiler output 174 to translation module 120. Rules table 128 analyzes compiler output 174, identifies the PERFORM keyword and program name, and generates the corresponding JAVA command "private void perform1000init( )" By maintaining a similar naming structure between legacy application module 150 and translated application module 140, users familiar with source code 158 may quickly become familiar with translated source code 148.

Rules table 128 may map a number of identifiers, elements, symbols, records, I/O statements, read and write commands, embedded SQL programs, or other keywords from one programming language to a second programming language. For example, for a COBOL to JAVA translation, translation module 120 may map a main program with a CICS entry point for JCICS or a main program with batch main. Translation module 120 may map JAVA methods from COBOL paragraphs and method invocations from COBOL PERFORM statements. Translation module 120 may also create JAVA member variables for each level 01 data structure and a JAVA class from each level 01 data structure identified by record generator 130. In certain embodiments, source code template 125 includes JAVA getters and setters in the JAVA classes based on COBOL ADD, SET, and MOVE commands.

In certain embodiments, translation module 120 converts source code 158 into comments, which are then inserted into translated source code template 148. For example, compiler 160 may compile source code 158 written in a first programming language. Translation module 120 receives compiler output 174 and maps the keywords used in source code 158 to keywords used in a second programming language. Translation module 120 may then create translated source code template 148 written in a second programming language. Translation module 120 may then insert portions of source code 158 as comments in translated source code template 148. Translation module 120 may locate the comments so that they are found near the classes or elements they correspond to in translated source code template 148.

Translation module 120 may also generate comments in translated source code template 148 directing a user to perform certain tasks. For example, translated source code template 148 may be written in JAVA. Translation module 120 may recognize a portion of critical enterprise logic in source code 158 that is necessary for translated application module 140 to properly function. Translation module 120 may identify the relevant source code in the first programming language and convert it to comments in JAVA. Translation module 120 may include a TODO JAVA command in the comments to alert users that a specific portion of translated source code template 148 needs further analysis. FIGS. 4A-4D below provide an additional discussion of how translation module 120 may also generate comments in translated source code template 148.

Translation module 120 may also contain logic for a structure analyzer 129. Structure analyzer 129 determines if compiler output 174 contains high-level data structures. If structure analyzer 129 identifies a high-level data structure, structure analyzer 129 may then send the compiler output 174 associated with the high-level data structure to record generator 130.

As another example, translation module 120 may convert source code 158, written in COBOL, to translated source code template 148 written in JAVA. Source code 158 may include a level 01 data structure. The level 01 data structure may further contain one or more group items and/or fields. Translation module 120 receives compiler output 174 containing the data structures describing the level 01 data structure. Structure analyzer 129 may analyze compiler output 174, identify the level 01 data structures, and transfer the data associated with the level 01 data structures to record generator 130.

In certain embodiments, source code 158 includes a COBOL copybook. Translation module 120 receives compiler output 174, associated with the COBOL copybook, and structure analyzer 129 may send the data associated with the copybook to record generator 130. Record generator 130 may then create a JAVA class based on the COBOL copybook. Record generator 130 may then communicate the JAVA class to translated application module 140 to be stored in translated source code template 148.

Record generator 130 represents any suitable component or components that facilitate the translation of high-level data structures from a first programming language to a second programming language. For example, source code 158 may include a level 01 record written in COBOL. Record generator 130 may receive the compiler output associated with the COBOL record, and translate it into a high-level data structure of a second programming language, for example a JAVA class. Record generator 130 may include a network server, remote server, mainframe, host computer, workstation, web server, personal computer, file server, or any other suitable device operable to communicate with other devices and process data. In some embodiments, record generator 130 may execute any suitable operating system such as IBM's zSeries/Operating System (z/OS), MS-DOS, PC-DOS, MAC-OS, WINDOWS, UNIX, OpenVMS, Linux, or any other appropriate operating systems, including future operating systems.

The functions of record generator 130 may be performed by any suitable combination of one or more servers or other components at one or more locations. In the embodiment where the modules are servers, the servers may be public or private servers, and each server may be a virtual or physical server. The server may include one or more servers at the same or at remote locations. Record generator 130 may also include any suitable component that functions as a server. In some embodiments, translation module 120, translated source code template 148, source code 158, compiler 160, and workstation 190 may be integrated with record generator 130, or they may operate as part of the same device or devices. In certain embodiments, record generator 130 may be a part of translation module 120 and contained in memory 126. In some embodiments, record generator 130 may be the record generator included in the IBM JZOS Toolkit.

In the illustrated embodiment, record generator 130 includes network interface 132, processor 134, and memory 136.

Interface 132, represents any suitable device operable to receive information from network 110, transmit information through network 110, perform suitable processing of the information, communicate to other devices, or any combination thereof. In certain embodiments, interface 132 facilitates the translation of source code 158 by receiving from translation module 120 the compiler output 174 associated with the high-level data structures used by source code 158. As another example, interface 132 may communicate translated high-level data structure 138 to translated application module 140 to be added to translated source code template 148. Interface 132 represents any port or connection, real or virtual, including any suitable hardware and/or software, including protocol conversion and data processing capabilities, to communicate through a LAN, WAN, or other communication system that allows record generator 130 to exchange information with network 110, application module 105, translation module 120, compiler 160, workstation 190, or any other components of system 100.

Processor 134 communicatively couples interface 132, memory 136, and controls the operation of record generator 130. Processor 134 includes any hardware and software that operates to control and process information. For example, processor 134 receives compiler output 174 from translation module 120, which contains the high-level data structures used by source code 158. Processor 134 translates the high-level data structure into a corresponding class associated with the second programming language designated by translation module 120. Processor 134 may then transmit translated high-level data structure 138 to translated application module 140, which may store the high-level data structure in translated source code template 148. Processor 134 may be a programmable logic device, a microcontroller, a microprocessor, any suitable processing device, or any suitable combination of the preceding.

In certain embodiments, translation module 120 translates source code 158, written in COBOL, to translated source code template 148, written in JAVA. Source code 158 may include a level 01 data structure. The level 01 data structure may further contain one or more group items and/or fields (elementary items). Translation module 120 receives compiler output 174 describing the level 01 data structures. Structure analyzer 129 analyzes compiler output 174, identifies the level 01 data structures, and transfers the data associated with the level 01 data structures to record generator 130. Record generator 130 may then translate the level 01 data structure into a corresponding JAVA class representing the level 01 COBOL structure. In certain embodiments, record generator 130 may also create headers and setters for every field in the level 01 data structure. Record generator 130 may also create JAVA getter and setter methods for each field identified in the level 01 data structure. Record generator 130 may then transmit translated high-level data structure 138 to translated application module 140 to be stored in translated source code template 148.

Memory 136 stores, either permanently or temporarily, data, operational software, or other information for processor 134, other components of the record generator 130, or other components of system 100. Memory 136 includes any one or a combination of volatile or nonvolatile local or remote devices suitable for storing information. For example, memory 136 may include RAM, ROM, flash memory, magnetic storage devices, optical storage devices, network storage devices, cloud storage devices, solid state devices, or any other suitable information storage device or a combination of these devices. Memory 136 may store information in one or more databases, file systems, tree structures, any other suitable storage system, or any combination thereof. Furthermore, different information stored in memory 136 may use any of these storage systems (e.g., translated high-level data structure 138 may be stored in a relational database). Moreover, any information stored in memory 136 may be encrypted or unencrypted, compressed or uncompressed, and static or editable. While illustrated as including particular modules, memory 136 may include any suitable information for use in the operation of translation module 120. In the illustrated embodiment, memory 136 includes translated high-level data structure 138.

Analyzer module 150, accesses legacy application module 154 and analyzes source code 158. Analyzer module 150 has a plurality of tools that allow users to navigate and identify the critical business logic components of source code 158. For example, workstation 190 may use analyzer module 150 to analyze source code 158. Analyzer module may display a flow chart and an outline view of source code 158 on workstation 190. This may allow a user to better understand the structure of source code 158 when editing translated source code template 148. In certain embodiments, analyzer module 150 will display all the elements used in source code 158 and further display all references to the element in source code 158. This may enable a user to confirm the accuracy of the translated source code template 148 after translation module 120 translates source code 158. In certain embodiments, analyzer module 150 is a Rational Developer for System Z (RDz) program.

Compiler 160 converts source code 158, written in a first programming language, into a target language, such as object code, which is capable of being executed by a processor. Compiler 160 may be a computer program or a set of computer programs. In certain embodiments, compiler 160 is an IBM COBOL compiler that uses ADATA to create a SYSADATA file. Compiler 160 may create data structures that describe source code 158, including symbol table 162, parse tree 164, nesting table 166, and cross-reference table 168. Compiler output 174 may include one or more of the tables created by compiler 160.

Symbol table 162 includes identifiers used in source code 158. Symbol table 162 may include data associated with each identifier including, but not limited to: a unique identifier, the identifier's level number (e.g., in COBOL this may be level 01-49, 66, 77, or 88), the location in the source code where the identifier is defined or declared, the identifier's type (e.g., class, method, data, procedure), and the identifier's name.

Parse tree 164 contains data describing the layout and hierarchy between the programs, records, classes, fields, and methods of source code 158. In certain embodiments, parse tree 164 may include node numbers, node types, node subtypes, parent nodes, sibling node numbers, symbol identifier, and token number.

Nesting table 166 describes the name and nesting level of a program or identifier in source code 158. In certain embodiments, nesting table 166 may include the statement number where the identifier is defined or declared, program attributes, and the program-name length.

Cross-reference table 168 describes references to the identifiers in symbol table 162. Cross-reference table 168 may include information describing each identifier's length and the number of times the identifier is referenced in source code 158 following a program, procedure, verb, method, or class.

Workstation 190 enables one or more users to monitor, administer, or otherwise interact with application module 105, translation module 120, record generator 130, analyzer module 150, and compiler 160. Workstation 190 may include one or more laptops, personal computers, monitors, display devices, handheld devices, smartphones, servers, user input devices, or other suitable components for enabling user input. Workstation 190 may itself contain application module 105, translation module 120, record generator 130, analyzer module 150, and compiler 160.

In certain embodiments, a user may not be familiar with the structure, enterprise logic, or programming language used in source code 158. To gain a better understanding of source code 158, workstation 190 may access analyzer module 150 to deconstruct source code 158 into a flow chart, which allows a user to better understand the relationships between the elements of source code 158.

As another example, workstation 190 may communicate with translated application module 140 and access translated source code template 148. Workstation 190 may then allow a user to read through translated source code template 148 and identify any sections that require further action. For example, translated source code template 148 may be written in JAVA. A user may access translated source code template 148 through workstation 190 and search for any TODO comments. A user may then update or make changes to the translated source code template 148 based on the TODO comments.

In other embodiments, workstation 190 may communicate with translation module 120 to facilitate the translation of a program from a first programming language into a second programming language. For example, workstation 190 may update rules table 128 with new keywords, more efficient translation mapping, or mapping rules for new programming languages.

In an example embodiment of operation, legacy application module 150 includes source code 158 written in a first programming language, containing critical enterprise logic and a plurality of data structures using the logic. Compiler 160 receives source code 158 from legacy application module 150 and breaks down source code 158 into its component parts, which are described in symbol table 162, parse tree 164, nesting table 166, and cross-reference table 168. Workstation 190 identifies a second programming language for translation module 120 to convert source code 158. Translation module 120 receives compiler output 174 from compiler 160, and using rules table 128, maps the first programming language's keywords found in source code 158 into keywords associated with the second programming language. In certain embodiments, translation module 120 may also convert source code 158 into comments and place the comments in source code template 125. Structure analyzer 129 analyzes source code output 174 for any high-level data structures used in source code 158. If structure analyzer 129 detects any high-level data structures in compiler output 174, structure analyzer 129 may then send the compiler output 174 associated with the high-level data structures to record generator 130. Record generator 130 may then convert the high-level data structures of the source code written in a first programming language, into corresponding high-level data structures associated with the second programming language. After translation module 120 and record generator 130 have converted source code 158 into a second programming language, translation module 120 may transmit source code template 125 to translated application module 140 to be stored as translated source code template 148. Record generator 130 may also transmit translated high-level data structure 138 to translated application module 140 to be stored in translated source code template 148. In this manner, source code 158 may be translated from a first programming language into a second programming language.

In certain embodiments, a non-transitory computer readable storage medium includes logic that is operable when executed by a processor to receive compiler output 174 based on source code 158. The non-transitory computer readable storage medium may then analyze compiler output 160 for data structures and build an internal representation of source code 158 based on the compiler output 174. The non-transitory computer readable storage medium may then create source code template 125 using the internal representation of source code 158 that is based on a second programming language.

A component of system 100 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to system 100 without departing from the scope of the invention. For example, multiple translation modules 120 may work in parallel to facilitate the translation of source code 158 from a first programming language into a second programming language. As another example, translation module 120 may contain record generator 130. System 100 may include any number of application modules 105, translation modules 120, record generators 130, compilers 160, and workstations 190. Any suitable logic may perform the functions of system 100 and the components within system 100.

Figure 2:
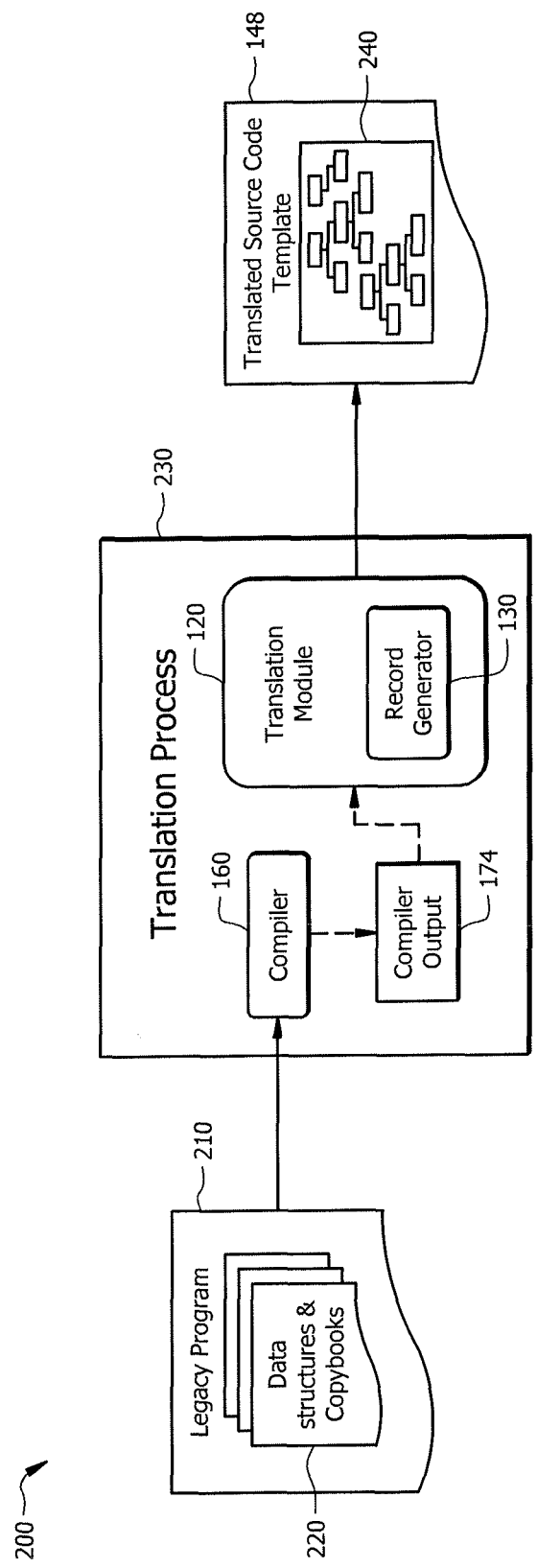
FIG. 2 illustrates a process for translating the source code of a computer program from a first programming language to a second programming language.

FIG. 2 illustrates process 200 for translating the source code of a computer program from a first programming language to a second programming language. Process 200 includes legacy program 210, which contains data structures and copybooks 220 written in a first programming language. Legacy program 210 may then go through translation process 230, wherein legacy program 210 is transmitted to compiler 160, which converts data structures and copybooks 220 into compiler output 174. Translation module 120 receives compiler output 174. In certain embodiments, translation module 120 contains record generator 130. Translation module 120 transmits the output of translation process 230 to translated source code template 148. Translated source code template 148 includes classes and objects 240 written in a second programming language, corresponding to data structures and copybooks 220 of legacy program 210.

In certain embodiments legacy program 210 is an application containing critical enterprise logic in a first programming language. Translation process 230 is setup to translate legacy program 210 from the first programming language into a second programming language. After going through translation process 230, the critical enterprise logic is translated and stored in translated source code template 148, which is written in the second programming language. The critical enterprise logic in translated source code template 148 may more easily be maintained, updated, and leveraged with new application development.

Figure 3:
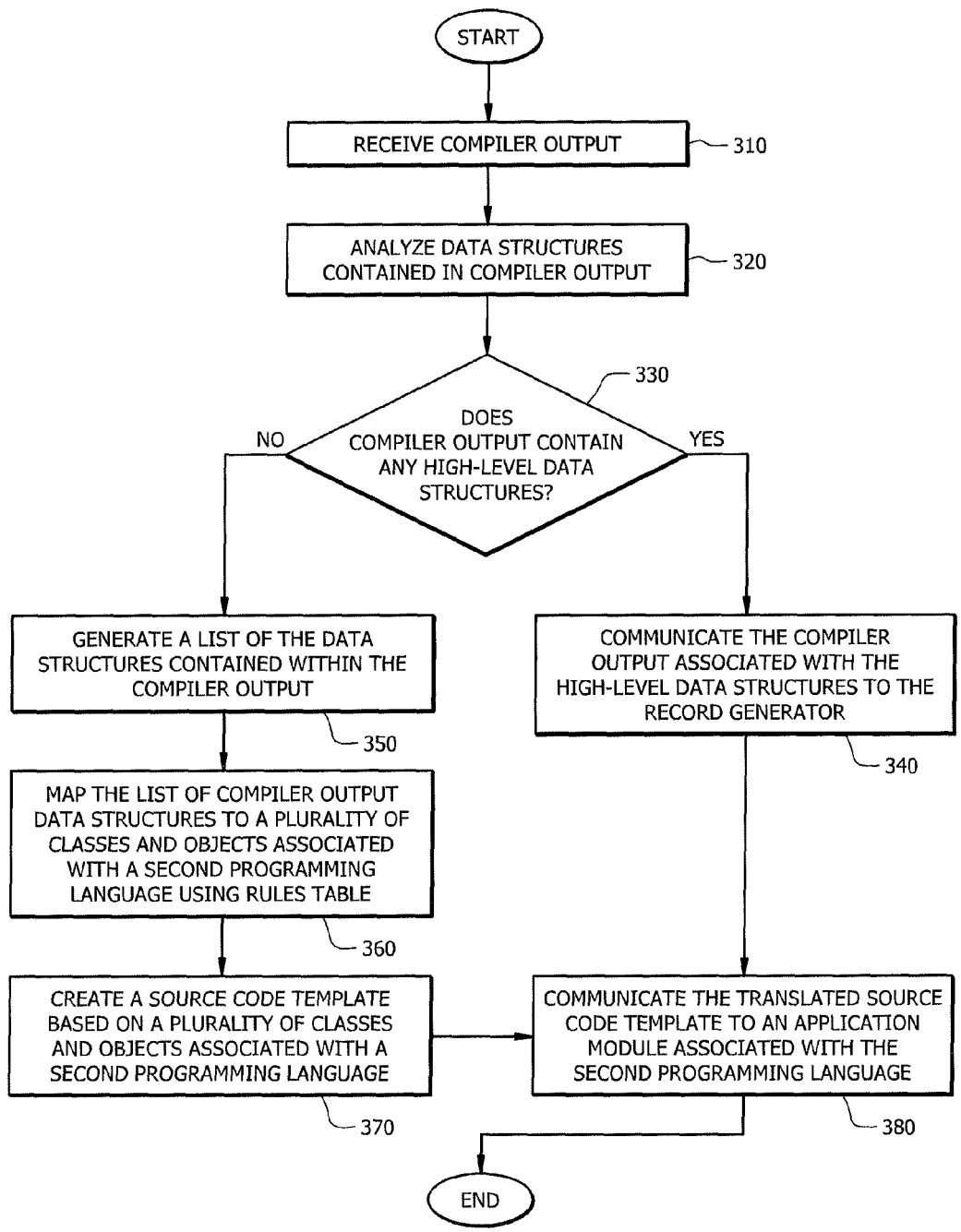
FIG. 3 illustrates a flowchart for receiving a compiler output based on source code written in a first programming language and translating the source code into a second programming language.

FIG. 3 illustrates a flowchart for receiving compiler output based on source code written in a first programming language and translating the source code into a second programming language.

At step 310, translation module 120 receives compiler output 174 from compiler 160. Compiler output 174 is based on source code 158 contained in legacy application module 150, which is written in a first programming language. In certain embodiments, the first programming language is COBOL.

At step 320, translation module 120 analyzes the data structures contained in source code output 174. In some embodiments, compiler 160 stores information regarding source code 158 into a plurality of tables and data structures including symbol table 162, parse tree 164, nesting table 166, and cross-reference table 168.

At step 330, translation module determines whether compiler output 174 contains one or more high-level data structures. In some embodiments, translation module 120 uses structure analyzer 129 to determine if compiler output 174 contains high-level data structures. For example, source code 158 may be written in COBOL and contain one or more level 01 data structures, such as a record. Compiler output 174 contains data structures describing the level 01 record, which may be identified by structure analyzer 129. If structure analyzer 129 determines that compiler output 174 contains a high-level data structure, the sequence proceeds to step 340. If translation module determines that compiler output 174 does not contain a high-level data structure, then the sequence proceeds to step 350.

At step 340, translation module 120 transmits compiler output 174, associated with the high-level data structure identified by structure analyzer 129, to record generator 130. In certain embodiments, record generator 130 may be a part of translation module 120. Record generator 130 may then receive the high-level data structure and convert the high-level data structure written in the first programming language to a corresponding data structure written in a second programming language. For example, source code 158 may be written in COBOL and contain a level 01 data structure. Translation module 120 receives compiler output 174, identifies the level 01 data structure using structure analyzer 129, and communicates the compiler output 174 associated with the level 01 data structure to record generator 130.

In step 350, translation module 120 generates a list of the data structures contained within compiler output 174. In certain embodiments, translation module 120 may build an internal representation of source code 158 based on compiler output 174.

In step 360, translation module 120 maps the data structures within compiler output 174 to a plurality of classes and objects associated with a second programming language using rules table 128. Rules table 128 may identify keywords corresponding to a first programming language contained in compiler output 174. Rules table 128 may then map the first programming language's keywords to a corresponding set of keywords associated with a second programming language. The translated keyword or keywords provide the same functionality as the keywords of the first programming language. Rules table 128 may also identify how the records and fields in source code 158 are structured in order to maintain the program flow in source code template 125.

In step 370, translation module 120 creates source code template 125 based on the plurality of classes and objects mapped by rules table 128 associated with the second programming language. In certain embodiments, translation module 120 will be setup to translate COBOL to JAVA. For example, rules table 128 may identify a COBOL PERFORM verb in compiler output 174 as a keyword and map the PERFORM verb to a corresponding JAVA method that performs the equivalent work of the PERFORM statement. Rules table 128 may also identify the statements that the PERFORM verb executes and create a corresponding JAVA routine. Translation module 120 may then create source code template 125 that includes the JAVA methods and routines that correspond to the PERFORM verb.

In step 380, source code template 125 and/or translated high-level data structure 138 are transmitted to translated application module 140. Translated application module 140 may then store source code template 125 and/or translated high-level data structure 138 as translated source code 148. In this manner, source code 158, written in a first programming language, may be translated into a second programming language and stored as translated source code template 148.

Various embodiments may perform some, all, or none of the steps described above. For example, certain embodiments may omit steps 330 and 340 under certain conditions. Furthermore, certain embodiments may perform these steps in a different order or in parallel. Moreover, one or more steps may be repeated. For example, source code 158 may be translated in multiple steps involving one or more compiler outputs 174, source code templates 125, and translated high-level data structure 138. While discussed as translation module 120 performing these steps, any suitable component of system 100 may perform one or more steps of the method.

FIG. 4A illustrates an example translated source code template including member variables. Translated source code subsection 400a contains translated ZFile member variable code 410 and translated high-level member variable code 420.

Translated ZFile member variable code 410 illustrates an example embodiment of translation module 120 converting ZFile objects of source code 158 into member variables in translated source code template 148. In the illustrated embodiment, translation module 120 creates source code template 125 including member variables for the ZFile objects "DUMP-FLE."

Translated high-level member variable code 420 illustrates an example embodiment of translation module 120 creating member variables in JAVA based on the level 01 data structures contained in source code 158. In the illustrated embodiment, translation module 120 identifies COBOL level 01 data structure "DUMP-RC" and creates a corresponding member variable "private DumpRc" in source code template 125. Similarly, translation module 120 identifies COBOL level 01 data structure AUDIT-RECORD" and creates the JAVA member variable "private AuditRecord."

FIG. 4B illustrates an example source code template including translated file access commands. Translated source code subsection 400b includes translated file open method 430 and translated file read method 440.

Translated file open method 430 illustrates the output of translation module 120 based on source code 158 containing a COBOL file processing operation. In the illustrated embodiment, translation module 120 identifies the COBOL "open" statement along with the corresponding file, "AuditFile." Translation module 120 may then create corresponding JAVA methods and member variables to perform the functions of the COBOL file processing operation. In certain embodiments, translated file open method 430 may open a ZFile object using JZOS DD statement format.

Translated file read method 440 illustrates the output of translation module 120 based on source code 158 containing a COBOL file processing operation. In the illustrated embodiment, translation module 120 identifies the COBOL "read" statement along with the corresponding file, "AuditFile." Translation module 120 may then create corresponding JAVA methods and member variables to perform the functions of the COBOL file processing operation. In certain embodiments, translated file read method 440 may read a ZFile record into an object of a class created by record generator 130.

FIG. 4C illustrates an example translated source code template including translated methods and method invocations. Translated source code subsection 400c includes translated method 450, translated TODO comment 460, and translated setter method 470.

Translated method 450 illustrates the output of translation module 120 based on source code 158 containing a COBOL PERFORM statement. In the illustrated embodiment, translation module 120 identifies the COBOL PERFORM statement along with the "1000-INIT" paragraph used in source code 150. Translation module 120 may create the JAVA method "private void Perform1000Init( )" based on the PERFORM command and the paragraph name. In certain embodiments, translation module will generate the comment identifying the command and name of the COBOL paragraph that the translated JAVA method is based on.

Translated TODO comment 460 includes a TODO comment directing a user to take further action on the getter method "dfheiblk.getEibcalen( )" In certain embodiments, translation module 120 creates the TODO comment for the getter method in translated TODO comment 460 in response to identifying COBOL statement types other than ADD, SET, and MOVE.

Translated setter method 470 includes a JAVA setter command that corresponds to the commented COBOL MOVE statement. In certain embodiments, translation module 120 identifies the ADD, SET, and MOVE statements found COBOL source code 158 and creates corresponding JAVA getters and setters in translated source code template 148.

FIG. 4D illustrates translated source code template 148 after a manual update of source code template 125. Translated source code subsection 400d includes translated comment section 480 and translated source code 490.

In certain embodiments, translated comment section 480 is created by translation module 120 by converting source code 158 into comments. In certain embodiments, translation module 120 may place translated comment section 480 near or in the translated method that translated comment section 480 corresponds. In this manner, users on workstation 190 may quickly reference the portions of source code 158 that are reproduced in translated source code template 148.

Translated source code 490 represents the translated JAVA code that performs COBOL paragraph 1000-INIT. In the illustrated embodiment, translated source code 490, written in JAVA, improves the error message handling and logging of COBOL source code 158, represented in translated comment section 480.

Certain embodiments of the disclosure may provide one or more technical advantages. A technical advantage of one embodiment may allow for improved productivity by utilizing modern tools that are associated with newer programming languages. Certain embodiments may leverage the skill sets of a wider talent pool as more programmers are able to work with a second, more familiar, programming language. Some embodiments may allow for the easier maintenance, upkeep, and development of the critical enterprise systems by translating source code written in an antiquated programming language into a modern language. Certain embodiments of the present disclosure may facilitate reduced development time of program translation leading to saved time and reduced costs. One or more other technical advantages may be readily apparent to one skilled in the art from the figures, descriptions, and claims, included herein.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for translating computer code, comprising:
receiving a compiler output, wherein the compiler output comprises a first set of data structures that are associated with a source code written in a first programming language;
analyzing the first set of data structures within the compiler output;
building an internal representation of the source code based on the compiler output, wherein building the internal representation comprises mapping the first set of data structures to a second set of data structures associated with a second programming language; and
creating a source code template using the second set of data structures associated with the second programming language.

2. The method of claim 1, wherein the first programming language is COBOL and the second programming language is JAVA.

3. The method of claim 2, further comprising:
identifying a level 01 data structure in the compiler output; and
communicating the compiler output associated with the level 01 data structure to a record generator.

4. The method of claim 2, further comprising:
in response to determining that the compiler output contains a CICS DFHCOMMAREA command, generating a corresponding CICS main entry point in the source code template; and
in response to determining that the compiler output contains a file definition, generating a corresponding JZOS ZFile and associated access methods in the source code template.

5. The method of claim 1, wherein building an internal representation of the source code based on the compiler output comprises:
generating a list of the data structures within the first set of data structures within the compiler output;
mapping the first set of data structures within the compiler output to a plurality of classes and objects associated with the second programming language;
assigning to the classes and object associated with the second programming language, a name that corresponds to the first set of data structures contained in the compiler output.

6. The method of claim 1, further comprising:
in response to determining that the compiler output contains a SQL command, generating a corresponding embedded SQL command comment in the source code template.

7. The method of claim 1, further comprising transforming a plurality of source code of the first programming language into a plurality of comments in the source code template of the second programming language.

8. Non-transitory tangible computer readable storage medium comprising logic, the logic operable, when executed by a processor, to:
receive a compiler output, wherein the compiler output comprises a first set of data structures that are associated with a source code written in a first programming language;
analyze the first set of data structures within the compiler output;

build an internal representation of the source code based on the compiler output, wherein building the internal representation comprises mapping the first set of data structures to a second set of data structures associated with a second programming language; and create a source code template using the second set of data structures associated with the second programming language.

9. The non-transitory tangible computer readable storage medium of claim 8, wherein the first programming language is COBOL and the second programming language is JAVA.

10. The non-transitory tangible computer readable storage medium of claim 9, wherein the logic is further operable, when executed by a processor, to:

identify a level 01 data structure in the compiler output; and
communicate the compiler output associated with the level 01 data structure to a record generator.

11. The non-transitory tangible computer readable storage medium of claim 9, wherein the logic is further operable, when executed by a processor, to:

in response to determining that the compiler output contains a CICS DFHCOMMAREA command, generate a corresponding CICS main entry point in the source code template; and in response to determining that the compiler output contains a file definition, generating a corresponding JZOS ZFile and associated access methods in the source code template.

12. The non-transitory tangible computer readable storage medium of claim 8, wherein the logic operable, when executed by a processor, to build an internal representation of the source code based on the compiler output comprises:

generate a list of the data structures within the first set of data structures within the compiler output;

map the first set of data structures within the compiler output to a plurality of classes and objects associated with the second programming language; and assign to the classes and object associated with the second programming language, a name that corresponds to the first set of data structures contained in the compiler output.

13. The non-transitory tangible computer readable storage medium of claim 8, wherein in response to determining that the compiler output contains a SQL command, the logic is further operable, when executed by a processor, to:

generate a corresponding embedded SQL command comment in the source code template.

14. The non-transitory tangible computer readable storage medium of claim 8, wherein the logic is further operable, when executed by a processor, to:

transform a plurality of source code associated with the first programming language into a plurality of comments in the source code template of the second programming language.

15. An apparatus for translating computer code, comprising:

an interface operable to receive a compiler output, wherein the compiler output comprises a first set of data structures that are associated with a source code written in a first programming language;

a memory operable to store the compiler output; and a processor communicatively coupled to the interface and memory, the processor operable to:

analyze the first set of data structures within the compiler output;

build an internal representation of the source code based on the compiler output wherein building the internal representation comprises mapping the first set of data structures to a second set of data structures associated with a second programming language; and create a source code template using the second set of data structures associated with the second programming language.

16. The apparatus of claim 15, wherein the first programming language is COBOL and the second programming language is JAVA.

17. The apparatus of claim 16, wherein the processor is further operable to:

identify a level 01 data structure in the compiler output; and
send the compiler output associated with the level 01 data structure to a record generator.

18. The apparatus of claim 16, wherein the processor is further operable to:

in response to determining that the compiler output contains a CICS DFHCOMMAREA command, generate a corresponding CICS main entry point in the source code template; and in response to determining that the compiler output contains a file definition, generate a corresponding JZOS Zfile and associated access methods in the source code template.

19. The apparatus of claim 15, wherein the processor operable to build an internal representation of the source code based on the compiler output comprises:

generate a list of the data structures within the first set of data structures within the compiler output;

map the first set of data structures within the compiler output to a plurality of classes and objects associated with the second programming language; and assign to the classes and object associated with the second programming language, a name that corresponds to the first set of data structures contained in the compiler output.

20. The apparatus of claim 15, wherein in response to determining that the compiler output contains a SQL command, the processor is further operable to generate a corresponding embedded SQL command comment in the source code template.

* * * * *